(12) United States Patent
Vorovitchik (10) Patent No.: US 9,109,947 B2
(45) Date of Patent: Aug. 18, 2015

(54) APPARATUS AND METHOD FOR NAVIGATION

(75) Inventor: Shlomo Vorovitchik, Moshav Faran (IL)

(73) Assignee: VOROTEC LTD., Moshav Faran (IL)

( * ) Notice: Subject to any disclaimer, the term of this patent is extended or adjusted under 35 U.S.C. 154(b) by 746 days.

(21) Appl. No.: 13/421,530

(22) Filed: Mar. 15, 2012

(65) Prior Publication Data

US 2012/0175496 A1    Jul. 12, 2012

Related U.S. Application Data

(63) Continuation-in-part of application No. PCT/IL2010/000780, filed on Sep. 21, 2010.

(30) Foreign Application Priority Data

Sep. 22, 2009    (IL) .......................................... 201110

(51) Int. Cl.
*G01C 21/02*    (2006.01)
*G01J 4/04*    (2006.01)
(Continued)

(52) U.S. Cl.
CPC . *G01J 4/04* (2013.01); *G01C 17/34* (2013.01); *G01C 21/02* (2013.01); *G01J 2004/005* (2013.01)

(58) Field of Classification Search
CPC ...... G01C 17/34; G01C 21/02; G01C 21/025; G01J 4/04; G01J 4/00; G01J 2004/00; G01J 2004/001; G01J 2004/002; G01J 2004/005; G01B 27/288; G01B 27/28
USPC ............. 250/225, 203.1, 203.3, 203.4, 206.1, 250/206.2; 33/268, 281; 701/513
See application file for complete search history.

(56) References Cited

U.S. PATENT DOCUMENTS 3,917,408 A * 11/1975 Stachnik ....................... 356/367
4,577,414 A    3/1986 Migliori et al.
(Continued)

FOREIGN PATENT DOCUMENTS

| CN | 1789916 A | 6/2006 |
|----|-----------|--------|
| CN | 1847927 A | 10/2006 |

(Continued)

OTHER PUBLICATIONS

Abstract of Bernard et al., "Functional similarities between polarization vision and color vision," Vision Research, 1977, vol. 17, pp. 1019-1028.

(Continued)

*Primary Examiner* — John Lee
(74) *Attorney, Agent, or Firm* — Oliff PLC (57)    ABSTRACT

An apparatus and system for use in determining location of a celestial body are presented. The apparatus comprises: a polarizer comprising an array of polarized light filter cells and a light sensor array. The array of polarized light filter cells comprises at least a first polarization direction and a second polarization direction different from said first polarization direction. And the polarizer thereby produces polarized light of at least first and second different polarizations. The light sensor array is configured to receive the polarized light from the polarizer and produce data indicative of a pattern of at least one of light polarization intensity and direction. The pattern is indicative of at least one of azimuth and elevation of the celestial body to be located.

19 Claims, 8 Drawing Sheets

(51) Int. Cl.
G01C 17/34 (2006.01)
G01J 4/00 (2006.01)

(56) References Cited

U.S. PATENT DOCUMENTS

| | | | |
|---|---|---|---|
| 5,095,199 A * | 3/1992 | Selby et al. | 250/206.2 |
| 5,424,535 A | 6/1995 | Albion et al. | |
| 5,692,226 A | 11/1997 | Hall | |
| 5,815,590 A * | 9/1998 | Buttner et al. | 382/103 |
| 6,075,235 A | 6/2000 | Chun | |
| 6,087,646 A * | 7/2000 | Didinsky | 250/203.4 |
| 6,490,801 B1 * | 12/2002 | Hersom et al. | 33/268 |
| 6,690,458 B2 * | 2/2004 | Schorr | 356/141.5 |
| 6,987,257 B2 * | 1/2006 | Peck et al. | 250/206.2 |
| 7,092,093 B2 * | 8/2006 | Ishihara | 356/369 |
| 7,447,591 B2 * | 11/2008 | Belenkii et al. | 701/468 |
| 7,582,857 B2 * | 9/2009 | Gruev et al. | 250/225 |
| 7,697,203 B2 | 4/2010 | Cha et al. | |
| 7,873,490 B2 * | 1/2011 | MacDonald | 702/127 |
| 8,045,163 B2 | 10/2011 | Grau | |
| 8,238,026 B1 | 8/2012 | Kemme et al. | |
| 8,355,868 B2 * | 1/2013 | Brace | 701/513 |
| 8,462,435 B2 | 6/2013 | Aoki | |
| 8,471,906 B2 * | 6/2013 | Belenkii et al. | 348/144 |
| 8,530,817 B1 * | 9/2013 | Smith | 250/208.2 |
| 8,964,072 B2 * | 2/2015 | Vorovitchik | 348/272 |
| 2002/0044282 A1 * | 4/2002 | Moeller et al. | 356/369 |
| 2002/0171881 A1 | 11/2002 | Merrill et al. | |
| 2004/0144910 A1 * | 7/2004 | Peck et al. | 250/206.2 |
| 2005/0023466 A1 * | 2/2005 | Maldziunas et al. | 250/338.1 |
| 2006/0124838 A1 * | 6/2006 | Baker et al. | 250/221 |
| 2007/0117078 A1 * | 5/2007 | Bruns et al. | 434/284 |
| 2007/0229955 A1 | 10/2007 | Kawamura et al. | |
| 2007/0241267 A1 * | 10/2007 | Gruev et al. | 250/225 |
| 2008/0258051 A1 | 10/2008 | Heredia et al. | |
| 2009/0021598 A1 | 1/2009 | McLean et al. | |
| 2009/0278954 A1 | 11/2009 | Kanamori et al. | |
| 2010/0208060 A1 | 8/2010 | Kobayashi et al. | |
| 2010/0283840 A1 * | 11/2010 | Belenkii et al. | 348/61 |
| 2010/0303344 A1 | 12/2010 | Sato et al. | |
| 2010/0309291 A1 | 12/2010 | Martinez et al. | |
| 2010/0321476 A1 | 12/2010 | Martinez et al. | |
| 2011/0050854 A1 | 3/2011 | Kanamori et al. | |
| 2011/0051149 A1 * | 3/2011 | McComas et al. | 356/614 |
| 2011/0058038 A1 | 3/2011 | Twede | |
| 2011/0077863 A1 * | 3/2011 | Brace | 701/208 |
| 2012/0126123 A1 | 5/2012 | Kondo et al. | |
| 2012/0173143 A1 * | 7/2012 | Belenkii et al. | 701/513 |
| 2012/0175496 A1 * | 7/2012 | Vorovitchik | 250/206.2 |
| 2012/0198710 A1 * | 8/2012 | Lupovka | 33/228 |
| 2012/0307128 A1 * | 12/2012 | Vorovitchik | 348/336 |

FOREIGN PATENT DOCUMENTS

| | | |
|---|---|---|
| CN | 101046523 A | 10/2007 |
| CN | 101218522 A | 7/2008 |
| CN | 101430201 A | 5/2009 |
| CN | 101441171 A | 5/2009 |
| JP | A-2004-117478 | 4/2004 |
| JP | 2008-026353 A | 2/2008 |
| JP | A-2009-055624 | 3/2009 |
| JP | 2009-139973 A | 6/2009 |
| JP | A-2009-139356 | 6/2009 |
| JP | 2009-157043 A | 7/2009 |
| JP | 2009-290895 A | 12/2009 |
| JP | A-2010-025915 | 2/2010 |

OTHER PUBLICATIONS

Blum et al., "Photoreceptor visual fields, ommatidial array, and receptor axon projections in the polarization-sensitive dorsal rim area of the cricket compound eye," J Comp Physiol A, 2000, vol. 186, pp. 119-128.

Abstract of Brunner et al., "Behavioural evidence for polarization vision in crickets," Physiological Entomology, Mar. 1987, vol. 12, pp. 1-10.

Abstract of Burghause, "Die strukturelle Spezialisierung des dorsalen Augenteils der Grillen (Orthoptera, Grylloidea)," Zool. Jb. Physiol., 1979, vol. 83, pp. 502-525.

Herzmann et al., "Spectral sensitivity and absolute threshold of polarization vision in crickets: a behavioral study," J Comp Physiol A, 1989, vol. 165, pp. 315-319.

Abstract of Labhart, "Polarization-opponent interneurons in the insect visual system," Nature, Feb. 1988, vol. 331, pp. 435-437.

Labhart, "How polarization-sensitive interneurones of crickets perform at low degrees of polarization," The Journal of Experimental Biology, 1996, vol. 199, pp. 1467-1475.

Abstract of Labhart, "How polarization-sensitive interneurones of crickets see the polarization pattern of the sky: A field study with an opto-electronic model neurone," The Journal of Experimental Biology, 1999, vol. 202, pp. 757-770.

Labhart, "Polarization-sensitive interneurons in the optic lobe of the desert ant *Cataglyphis bicolor*," Naturwissenschaften, Dec. 2000, vol. 87, pp. 133-136.

Labhart, "The physiology of the cricket's compound eye with particular reference to the anatomically specialized dorsal rim area," J Comp Physiol A, 1984, vol. 155, pp. 289-296.

Abstract of Labhart et al., "Detectors for polarized skylight in insects: a survey of ommatidial specializations in the dorsal rim area of the compound eye," Microscopy Research and Technique, Dec. 1999, vol. 47, pp. 368-379.

Abstract of Labhart et al., "Processing of polarized light information in the visual system of crickets," In Sensory Systems of Arthropods, 1993, pp. 158-168.

Abstract of Lambrinos et al., "An autonomous agent navigating with a polarized light compass," Adaptive Behavior, Jun. 1997, vol. 6, pp. 131-161.

Abstract of Petzold, "Polarisationsempfindliche Neuronen im Sehsystem der Feldgrille, Gryllus ampestris: Elektrophysiologie, Anatomie und Modellrechnungen," PhD thesis, University of Zurich, 2001.

Schwind et al., "Reflection-polarization patterns at water surfaces and correction of a common representation of the polarization pattern of the sky," Naturwissenschaften, 1993, vol. 80, pp. 82-83.

Ukhanov et al., "Dioptrics of the facet lenses in the dorsal rim area of the cricket *Gryllus bimaculatus*," J Comp Physiol A, 1996, vol. 179, pp. 545-552.

Abstract of Waterman, "Polarization sensitivity," Comparative Physiology and Evolution of Vision in Invertebrates B, Invertebrate Visual Centers and Behavior I (ed. H. Autrum),1981, pp. 281-469.

Abstract of Wehner, "The ant's celestial compass system: spectral and polarization channels," In Orientation and Communication in Arthropods (ed. M. Lehrer), 1997, pp. 145-185.

Wehner, "Polarization vision—a uniform sensory capacity?," The Journal of Experimental Biology, Apr. 2001, vol. 204, pp. 2589-2596.

Zufall, "Spectral and polarized light sensitivity of photoreceptors in the compound eye of the cricket (*Gryllus bimaculatus*)," J Comp Physiol A, 1989, vol. 164, pp. 597-608.

Labhart et al., "Spatial integration in polarization-sensitive interneurons of crickets: A survey of evidence, mechanisms and benefits," The Journal of Experimental Biology, 2001, vol. 204, pp. 2423-2430.

Kobayashi et al., "Navigating with a Polarized Light Compass", *Proceedings of the 14th Annual Conference of the Robotics Society of Japan*, Nov. 11, 1996, pp. 171-172, No. 1 (with abstract).

* cited by examiner

FIG.1

An apparatus unit 10

FIG.2

A polarizer 120

10 Apparatus

APPARATUS AND METHOD FOR NAVIGATION

BACKGROUND OF THE INVENTION

Simple and accurate geo-positioning based on solar movements have long been a goal of navigational instruments. Similarly, fast and dependable fixes of 'true north' while in some cases available from GPS, remains a tedious and time consuming chore for engineering, military, land surveying, airborne, sports and maritime uses. Detection of solar radiation and atmospheric conditions have long been the goal of climate forecast and green energy industries. Similarly, fast and low cost measurement of solar radiation and atmospheric particles, while in some cases can be provided by, for example, an active laser instrument, remains an expensive and time-consuming chore for climatology and green energy engineering.

SUMMARY OF THE INVENTION

Embodiments of the present invention may provide an apparatus including: an array of polarized light filter cells, each cell including a first polarized filter having a first polarization direction and a second polarized filter having a second polarization direction, said second polarization direction different from said first polarization direction. The second polarization direction may be substantially perpendicular to said first polarization direction. The filter cells may be arranged in co-centered rings.

The apparatus includes a first light sensor to produce data from light received through said first polarized filter and a second light sensor to produce data from light received through said second polarized filter. The first and second light sensors may be comprised in an array of light sensors, having at least one light sensor juxtaposed to each polarized filter. The apparatus may further include an optical system, which may define a light collection surface configured to collect input light and direct it onto said array of polarized light filters, or may be accommodated between said array of polarized light filters and the array of light sensors.

According to some embodiments, the apparatus is associated with (e.g. comprises) a processing unit to derive polarization pattern based on said data produced by the array of light sensors. The processing unit may be for calculating at least one of intensity and direction of polarization by measuring a difference between a light intensity received through said first polarized filter and a light intensity received through said second polarized filter and for deriving said polarization pattern based on said calculations. The processing unit may be for calculating location data of a celestial body based on said polarization pattern, for example, at least one of azimuth and elevation of the celestial body. The processing unit may be for calculating navigational data based on said location data of a celestial body. The processing unit may calculate navigational data further based on complementary data stored in a memory.

An apparatus according to some embodiments of the present invention may further include a wavelength separator to separate at least one wavelength band from light directed by said optical system. A processor unit in the apparatus may calculate a pattern of polarized light in at least one wavelength band separated by the wavelength separator. The wavelength separator may include an array of color filters arranged in groups of at least one color filter, each group being juxtaposed to a polarized filter.

According to some embodiments of the present invention, the apparatus may include a memory for storing complementary data of at least one of a list comprising a sun path table, an astronomical chart, a calendar chart, an ephemeris table, a time standard, a skylight polarization chart, a calibrated chart of true north, magnetic north and grid north.

Further according to some embodiments of the present inventions, the apparatus may comprise an inclinometer for detecting the inclination of said apparatus.

Additionally, embodiments of the present invention may provide a method, the method may include: directing light onto an array of polarized light filter cells, each cell may include a first polarized filter having a first polarization direction and a second polarized filter having a second polarization direction different from said first polarization direction. The second polarization direction substantially perpendicular to said first polarization direction.

The method may further include producing data from light received through said first polarized filter by a first light sensor and through said second polarized filter by a second light sensor; and deriving polarization pattern based on said data.

According to some embodiments, the method may further include calculating at least one of intensity and direction of polarization by measuring the difference between the light intensity received through said first polarized filter and the light intensity received through said second polarized filter and creating said polarization pattern based on said calculations.

According to some embodiments of the present invention, the method may further include separating at least one wavelength band from said directed light. The calculation of a pattern of polarized light may be in at least one separated wavelength band.

According to some embodiments of the present invention, the method may further include detecting the inclination of said apparatus.

According to some embodiments of the present invention, the method may further include calculating location data of a celestial body based on said polarization pattern. The location data may include at least one of azimuth and elevation of said celestial body.

According to some embodiments of the present invention, the method may further include calculating navigational data based on said location data of a celestial body. In some embodiment of the present invention, the calculation of navigational data may further be based on complementary data stored in a memory.

Thus according to a broad aspect of the present invention there is provided an apparatus for use in determining location of a celestial body comprising: a polarizer comprising an array of polarized light filter cells comprising at least a first polarization direction and a second polarization direction different from said first polarization direction, said polarizer thereby producing polarized light of at least first and second different polarizations; and a light sensor array configured to receive the polarized light from said polarizer and produce data indicative of a pattern of at least one of light polarization intensity and direction, said pattern being indicative of at least one of azimuth and elevation of the celestial body. The second polarization direction may be substantially perpendicular to said first polarization direction. Alternatively or additionally the polarizer may comprise circular array of said polarized filter cells arranged in the form of co-centric rings. The polarizer may comprise at least a region thereof configured as a radial polarizer and/or at least a region thereof configured as a tangential polarizer.

According to some embodiments the sensor array is configured to provide said data indicative of the pattern of at least one of light polarization intensity and direction in the form of analogue signal corresponding to a difference in intensity of detected light passed through the filter cells of different polarization directions.

According to some other embodiments the apparatus comprises a processing unit configured and operable to receive and process the data indicative of the pattern of at least one of light polarization intensity and direction, to derive therefrom a polarization pattern, and utilizing the polarization pattern to determine said at least one of azimuth and elevation of the celestial body. The processing unit may be configured and operable for calculating at least one of intensity and direction of collected light polarization by measuring a difference between light intensity received through polarized filter cell having said first polarization direction and light intensity received through polarized filter cell having said second polarization direction and for deriving said polarization pattern based on said calculations.

The processing unit may be configured and operable for utilizing the detected azimuth and/or elevation of the celestial body for determining at least one of the following parameters: (a) location of said apparatus, (b) time of measurement, (c) headings of said apparatus (d) location of said starts. The processing unit may be configured for calculating navigational data based on said at least one of azimuth and elevation of said celestial body.

According to some embodiments the apparatus comprises a wavelength selective filter configured to separate at least one wavelength band from the input light. In such embodiments, where the apparatus comprises a processing unit, the later may be configured and operable for calculating the polarization pattern for at least one wavelength band. The wavelength selective filter may comprise one or more groups of filter cells comprising one or more filter cells configured to allow passage of at least two wavelength bands different from each other, each group being associated with corresponding polarized filter.

According to some embodiments of the present invention the apparatus comprises a memory unit configured and operable for storing complementary data of at least one of a list comprising a sun path table, an astronomical chart, a calendar chart, an ephemeris table, a time standard, a skylight polarization chart, a calibrated chart of true north, magnetic north and grid north.

According to some embodiments of the present invention, the apparatus is associated with an inclinometer for detecting the inclination of said apparatus with respect to a predetermined plane.

The apparatus may be configured to define a certain effective aperture, wherein the polarizer may be aligned with the entire or with a part of the effective aperture. The sensor array may thereby concurrently produce the data indicative of the pattern of at least one of light polarization intensity and direction, and data indicative of an image formed by light passing towards the sensor array through a part of the effective aperture outside said part aligned with the polarizer.

The apparatus may define one or more fields of view and may be configured and operable to concurrently direct light collected with said one or more field of view onto said light sensor array.

The apparatus may comprise an optical system comprising one or more optical elements accommodated upstream or downstream of the polarizer, or at both sides of the polarizer.

According to one other broad aspect of the present invention there is provided a method for use in determining location of a celestial body. The method comprising: directing ambient light through an array of at least two polarized light filter cells comprising filter cells having a first polarization direction and filter cells having a second polarization direction different from said first polarization direction; detecting light components passing through said at least two filter cells of the first and second polarization directions by a light sensor unit comprising at least two light sensor elements, and producing detection data indicative of a polarization pattern of said ambient light by detecting a difference in intensity of the detected light components; and processing the data indicative of the polarization pattern and identifying at least one of azimuth and elevation of said celestial body. The method may comprise calculating navigational data based on said location data of a celestial body.

According to yet another broad aspect of the present invention there is provided a system for use in determining navigational data. The system comprising a polarizer comprising an array of polarized light filter cells comprising at least a first polarization direction and a second polarization direction different from said first polarization direction, said polarizer thereby producing polarized light of at least first and second different polarizations; and a light sensor array configured to receive the polarized light from said polarizer and produce data indicative of a pattern of at least one of light polarization intensity and direction, said pattern being indicative of a location of the celestial body.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 6A-6D illustrate three examples of a system or apparatus for identifying location of a celestial body according to embodiments of the present invention, wherein

It will be appreciated that for simplicity and clarity of illustration, elements shown in the figures have not necessar-

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
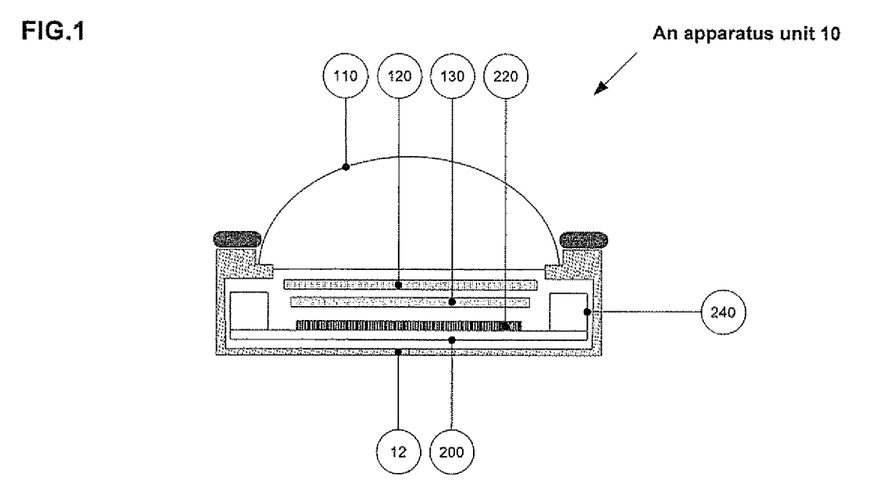
FIG. 1 is a cross-sectional schematic illustration of an apparatus for navigation according to some embodiments of the present invention.

Reference is now made to FIG. 1, which is a cross-sectional schematic illustration of an apparatus 10 for navigation according to some embodiments of the present invention. Apparatus 10 includes a polarizer 120 and a light sensor unit 220, and is associated with a processing unit 200. As shown in the figure, the apparatus may also include an optical system 110.

Optical system 110 may direct and/or focus light rays onto polarizer 120. In the present not limiting example, the optical system 110 is accommodated to define a light collection surface of the apparatus for collecting input light and directing it onto the polarizer. It should however be noted that in some configurations optical system 110 may be accommodated to collect light passing through polarizer 120 and direct it onto the light sensor unit 220. Optical system 110 may include single or multiple optical elements such as, for example, a lens, a lenslet array, micro-lenses, pinhole, fiber optics, waveguides, mirror/s or other suitable optical elements. In some embodiments, the same optical system 110 or an additional optical unit may be used to include optical zoom, moving optical elements and/or focus systems. It should be noted that optical system 110 may be configured as a light collection surface for apparatus 10 and according to some embodiments optical system 110 may be a simple transparent window configured to protect the apparatus from the surrounding, e.g. block dust particles. As indicated above, the optical system 110 may be configured to direct light passing through the polarizer unit 120 onto the sensor unit 220. According to some embodiments, certain elements of the optical system 110 are located upstream to the polarizer unit 120 with respect to direction of collected light propagation, while some other elements of system 110 are located downstream to polarizer unit 120 with respect to the collected light propagation direction.

Figure 2:
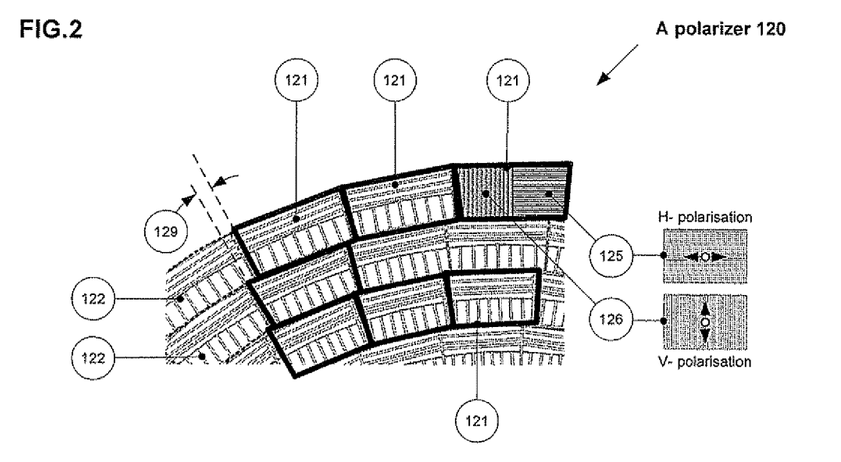
FIG. 2 is a schematic illustration of an exemplary polarizer according to some embodiments of the present invention.

Polarizer 120 may include an array of polarized light filters (shown in FIG. 2). Polarizer 120 may pass light components which are linearly polarized in a direction complying with the design of polarizer 120 and substantially block linearly polarized light components which are not complying with the design of the appropriate filter on the polarizer 120. As well known in the art, the intensity of light and/or shift in wavelength emerging from the polarizer 120 varies with respect to the polarization angle (state) of the input light in accordance with the orientation of the preferred plane of polarization of the polarizer device. The polarized light which passes through polarizer 120 may create a pattern of polarization intensity and/or direction of the absorbed light which is directed (e.g. reflected and/or projected) onto light sensor 220. For the purposes of this specification, the term "pattern" may include, but not limited to, a vector of values, a map of scales, or any other conventional meaning of the term "pattern". For example, polarizer unit 120 may be configured as a radial polarizer, axial (tangential) polarizer, or a combination of different polarization directions along the polarizer unit 120. Generally speaking, the sensor array and the polarizer are arranged such that different light sensors and/or groups of light sensors (pixels of a sensor array) and/or part of the light sensor array receives coupled light components of different polarizations, or a light sensor (pixel) receives light having a certain distribution (preferably narrow distribution) of polarization type/orientation.

When the optical system 110 directs and/or focuses onto polarizer 120 skylight (i.e. the radiation originated in the Sun and reflected and/or scattered by the atmosphere towards earth) or earthlight (i.e. the reflected and/or scattered skylight from earth), the pattern of polarization may enable obtaining navigational data by apparatus 10.

Light sensor 220 may include, for example, an image sensor. Light sensor 220 may include an array of light sensor cells that convert an optical signal to an electrical signal, such as, for example, an array of Avalanche Photodiodes (APD), a charge-coupled device (CCD), a complementary metal-oxide-semiconductor (CMOS), an active-pixel sensor (APS) or other suitable light sensor. According to some embodiments light sensor unit 220 may include at least two optical detector elements, e.g. two photo sensitive diodes or more. Light sensor 220 may produce data, for example, image data or other data related to the received light, and transmit the data to processing unit 200, which may record, analyze, process, store, compress, transmit, reconstruct, convert and/or derive data based on the produced data. In some embodiments, the produced data may not include an image, but may be limited to for example data about light intensity, a direction of polarized light intensities or other limited information that may be insufficient to create an image.

Polarizer 120 may include for example two or more kinds of polarization filters (such as those shown in FIG. 3) having corresponding two different polarization directions, for example, substantially perpendicular to each other or at other discernable angles. The polarized light which passes through polarizer 120 may create a pattern of polarization intensity and/or direction of the light projected onto light sensor 220. Based on the data produced by light sensor 220, processing unit 200 may calculate direction and/or intensity of the polarization of polarized light absorbed by different areas on light sensor 220. For example, processing unit 200 may calculate direction and/or intensity of the polarization by measuring the difference between the light intensities received through the two different kinds of polarization filters by respective two or more different areas on light sensor 220, thus, for example, deriving the polarization pattern. Based on the polarization pattern, processing unit 200 may obtain navigational data such as, for example, time, true-north, location, directional and/or other useful data. Processing unit 200 may obtain the navigational data, for example, by determining location of a celestial body such as the sun, stars or moon, for example, based on one or more derived polarization patterns.

In some embodiments, apparatus 10 may be directed so that optical system 110 may direct and/or focus skylight onto polarizer 120. Apparatus 10 may be installed on a directable platform such as, for example, a watch, a helmet, sun glasses, a handheld device, a vehicle, mapping and/or surveying equipment, communication and/or timekeeping hardware, or any other suitable platform. According to some embodiments, apparatus 10 may be a part of an existing imaging system which may have other imaging elements as well as intended for other imaging applications. In such configurations elements 110, 120, 130, 200, 220, 12 may be inserted along the optical flow (optical path) of the existing imaging system and cover all or a part of an effective aperture of the system. For example, elements of the apparatus 10 are embedded and/or added along a civilian imaging system, where elements 110, 120, 130 are inserted into the optical part of the imaging system and elements 200, 220 and 240 are part of the image processing unit of the civilian imaging system. The optical system 110 may be directed towards the zenith, for example, in order to collect skylight, with a wide or narrow field of view, onto polarizer 120, and/or in order to facilitate obtaining the location and navigational data. Alternatively, for example in cases of airborne and/or space borne uses, optical system 110 may be directed towards the nadir below and/or above the airborne platform and thus, for example, directing and/or focusing onto polarizer 120 reflection and/or scattering of skylight from ground. Additionally or alternatively, in some exemplary embodiments apparatus 10 may include a sensor module 240, which may include at least one orientation sensor such as, for example, global positioning system (GPS), inertial measurement unit (IMU), accelerometer, gyrometer, inclinometer, magnetic compass, altimeter, velocimeteror any other suitable sensor, in order to establish the orientation in space of apparatus 10 and/or motion information such as acceleration, velocity and/or distance of travel in space of apparatus 10. The establishment of orientation may include bearings in 6 degrees of freedom. In other embodiments, external orientation sensors such as mechanical, electronical, optical and/or visual odometer sensors may be used, for example, when apparatus 10 spins on a shaft encoder with its rotation axis aligned with the zenith-nadir vector while attached to a moving vehicle. Processing unit 200 may use the sensed orientation and/or motion information of apparatus 10 in order to compensate for the orientation of apparatus 10 in space, when calculating navigational data based on data received from light sensor 220. For example, in case the inclination of apparatus 10 deviates from being directed to the zenith or nadir, processing unit 200 may compensate for the deviated inclination when calculating location of a celestial body and/or when processing dead reckoning calculation, i.e. estimating current location based upon a previously determined location.

In some embodiments, apparatus 10 may be used underwater, for example by receiving skylight underwater and analyzing polarization pattern of skylight as discussed in detail above.

In addition to data received from light sensor 220, processing unit 200 may use complementary data to calculate the navigational data. The complementary data may include navigational and/or astronomical data, such as, for example, sun path tables, astronomical charts, calendar charts, ephemeris tables, time standards, skylight polarization charts, calibrated charts of true north, magnetic north and grid north, and/or any other data which may facilitate calculation of navigational data by processing unit 200. The complementary data may be received by processing unit 200, for example, from sources external to apparatus 10. Additionally or alternatively, processing unit 200 may receive the complementary data from an internal memory and/or from a memory which may be included in or otherwise associated with apparatus 10, which may store the complementary data.

Processing unit 200 may determine location of a celestial body such as the sun, stars or moon based on derived polarization pattern of skylight or earthlight. For example, processing unit 200 may determine the location of the celestial body in any celestial coordinates such as, for example, azimuth and/or elevation of the celestial body, for example the sun or moon, based on the derived polarization pattern. Processing unit 200 may deduce, for example, the true north, by combining the determined location of the celestial body with mathematical path and/or path tables of the celestial body and date and/or time data. The date and time data may be received by processing unit 200 from a source external to apparatus 10 or from sensor module 240, which may also include a timekeeping device such as, for example, a clock, a real time computer clock, clock oscillators and/or mechanical, electronic, optics and/or atomics chronometers. The path tables of the celestial body may include, for example, the daily mathematical path of the celestial body, e.g., the elevation and azimuth of the sun during the day, in different times of the year and global locations.

Based on the path tables of celestial body, date information and the location of celestial body determined by processing unit 200, processing unit 200 may calculate the global position of apparatus 10. Alternatively, processing unit 200 may receive global position data of apparatus 10, for example, from a global positioning system, a user interface and/or via a communication link external or internal to apparatus 10. Based on the global position data, path tables of celestial body and the location of celestial body determined by processing unit 200, processing unit 200 may deduce the time of the year, e.g. date information, for example in case processing unit 200 does not receive or obtain the date information from other sources.

Additionally or alternatively, processing unit 200 may obtain a timeline of the celestial body locations, for example, by accumulating the determined locations of a celestial body during at least a certain period of time. Based on the obtained timeline, processing unit 200 may deduce an approximated path of the celestial body, which may be used by processing unit for determination of time, date, real north and/or global position of apparatus 10.

In some embodiments of the present invention, apparatus 10 may include a wavelength separator 130. Wavelength separator 130 may separate one or more wavelength bands from the polarized light. Therefore, the polarized light which passes through polarizer 120 and wavelength separator 130 may create a pattern of polarization intensity and/or wavelength shift/filtering and/or direction for a certain wavelength band or for several wavelength bands, and such pattern may be projected onto light sensor 220. Wavelength separator 130 may include, for example, a color filter array such as, for example, a Bayer filter. Additionally or alternatively, wavelength separator 130 may include a trichroic beam splitter prism, bandpass and/or longpass and/or edgepass colored filters, dielectric mirrors, and/or any suitable wavelength separator. Although the example of FIG. 1 shows wavelength separator 130 between polarizer 120 and light sensor 220, other embodiments of the present invention may include other configurations, for example, so that polarizer 120 may receive the filtered light that passed through wavelength separator 130, on which the light may be directed and/or focused by optical system 110.

Different wavelength bands, which may be separated by wavelength separator 130, may be used by processing unit 200 for obtaining information such as atmospheric conditions, pollution levels, cloud densities, humidity, etc. Processing unit 200 may compare the different kinds of information and/or, for example, eliminate and/or measure the effect of pollution, clouds, humidity and/or other phenomena on the polarization pattern, for example in order to obtain more accurate navigational data based on the detected polarization pattern. For example, the polarization pattern of clear skies may be best viewed in the wavelength band around 450 nm, i.e. in the blue and violet colors. However, large particles which may be typical for pollution or clouds may scatter, and therefore be polarized, at the red and near infra red wavelength band, i.e. around 650 nm.

Apparatus 10 may be powered by an internal or external power source (not shown), such as for example, a battery, solar cells and/or other suitable power source. Additionally, apparatus 10 may include at least one antenna and/or wired and/or wireless circuitry (not shown), for example, in order to receive power and/or information from external power sources, data links, data bases and/or additional sensors and devices.

Reference is now made to FIG. 2, a schematic illustration of an exemplary polarizer 120 according to some embodiments of the present invention. Polarizer 120 may include an array of polarized light filter cells 121. Each cell 121 may include at least two polarized filters 125 and 126, having respective different directions of polarization, for example, substantially perpendicular to each other. Polarized filter cells 121 may be arranged in co-centered rings 122, for example in a disk shape. Other shapes and configurations may be used. One or more of polarized filters 125 and 126 may be juxtaposed to at least one light sensor cell in an array of light sensor cells which may constitute light sensor 220 described above with reference to FIG. 1. Thus, light sensor 220 may produce data from light received through polarized filters 125 and 126 in each cell 121. Cells 121 may be identical to each other or may include variations in the angles of filters 125 and 126. Higher number of cells 121 in polarizer 120 may enable higher imaging resolution by light sensor 220, limited by the maximal resolution of light sensor 220. The number of cells 121 in polarizer 120 may be determined by the dimensions of cells 121 and/or the number of rings 122. Additionally, the location of cells 121 may be shifted in each ring 122 relative to cells 121 in other rings 122, for example in a measure 129, which may enhance the imaging resolution of the polarization pattern by light sensor 220.

In some embodiments of the present invention polarizer 120 may include optical retardation plates and/or depolarizers such as: Cornu depolarizer, Lyot depolarizer, Wedge depolarizer and/or other suitable depolarizer, for example on at least a portion of polarizer disc 120. Additionally or alternatively, in some embodiments, polarizer 120 may include active and/or passive optical elements such as wave plates, retarders, quarter-wave plate, half-wave plate, Faraday rotator, liquid crystals (LCs) and/or fiber optics or any other suitable element which may be used to increase the imaging resolution of the light polarization pattern. Other embodiments of the present invention may include other configurations, for example, so that polarizer 120 may receive the filtered light that passed through a wave plate, on which the light may be directed and/or focused by optical system 110.

In order to derive the polarization pattern of the light, processing unit 200 may calculate intensity and/or direction of polarization of light received through each cell 121, for example by measuring a difference between light intensities received through polarized filters 125 and 126 in each cell 121.

Figure 3:
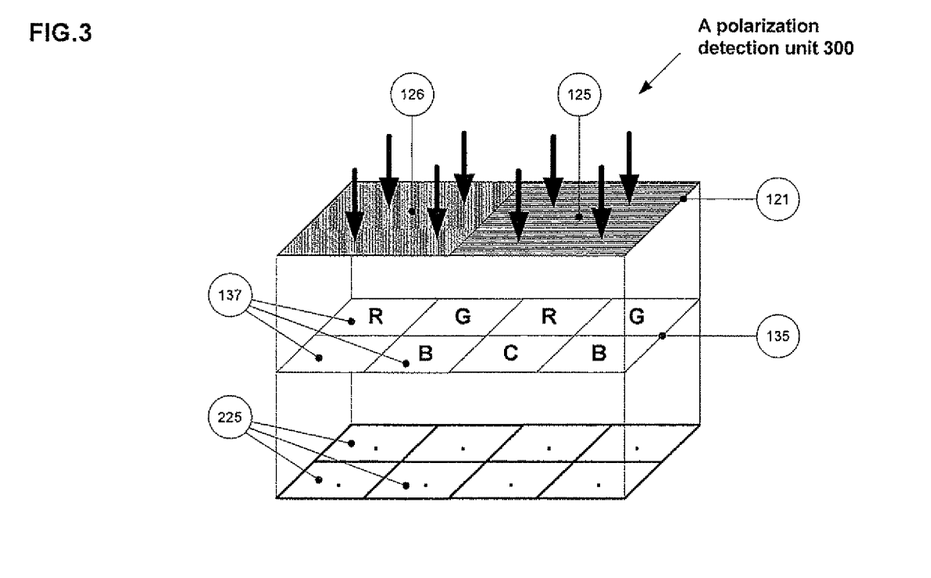
FIG. 3 is a partial schematic illustration of a polarization detection unit apparatus according to some embodiments of the present invention.

Reference is now made to FIG. 3, which is a partial schematic illustration of a polarization detection element 300 of apparatus 10 according to some embodiments of the present invention. Polarization detection unit 300 may include a cell 121 including polarized filters 125 and 126, color filter arrays 135 which may be included in wavelength separator 130 and light sensor cells 225 which may be included in light sensor 220. Color filter arrays 135 may be identical to each other. Each of color filter arrays 135 may include several color filters 137, for example four color filters 137 including color filters of at least three different colors, such as, for example, a Bayer filter. In other embodiments, color filter arrays may include another number of color filters 137 and/or another number of or different colors. Color filter arrays 135 may be juxtaposed to one of polarized filters 125 and 126. Light sensor 220 may include at least one light sensor cell 225 for each color filter 137. Thus, for example, each sensor cell 225 may absorb polarized light in a particular direction, intensity and wavelength.

Therefore, for example, processing unit 200 may calculate separately for each wavelength separated by wavelength separator 130 the intensity and/or direction of polarization of the absorbed light, and may use the data as described in detail with reference to FIG. 1.

Figure 4A:
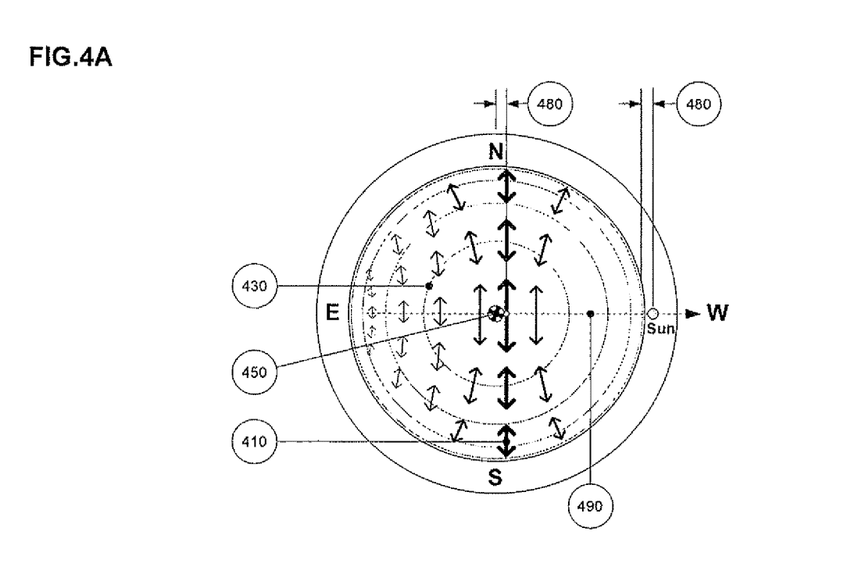
FIGS. 4A and 4B are schematic illustrations of polarization patterns which may be derived by a processing unit according to some embodiments of the present invention.
Figure 4B:
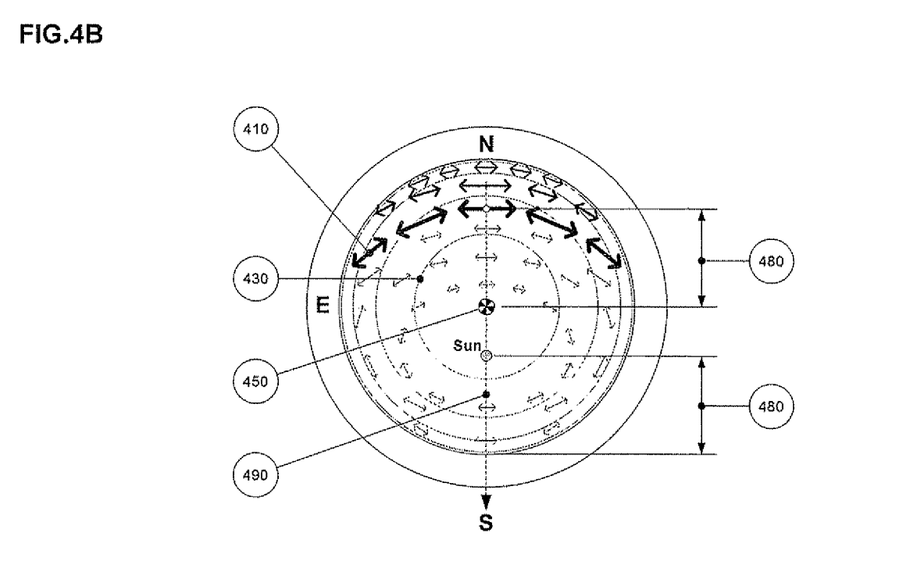

Reference is now made to FIGS. 4A and 4B, which are schematic illustrations of polarization patterns which may be derived by processing unit 200 according to some embodiments of the present invention. Arrows 410 illustrate the e-vectors of the light, i.e. direction and intensity of the polarization of light derived by processing unit 200, wherein the length and width of arrows 410 is respective to intensity of the linear polarization and the direction of arrows 410 is respective to the direction of linear polarization. In this exemplary embodiment, the center of light sensor 220 is aligned with the zenith 450, and a field of view of 180 degrees is captured by light sensor 220. FIG. 4A shows the polarization pattern derived by processing unit 200 at dawn, when the sun's elevation 480 is below the horizon and the sun's azimuth 490 is directed to the west. FIG. 4B shows the polarization pattern derived by processing unit 200 at solar noon, when the sun's elevation 480 is the highest in the sky nearest the zenith 450 during the day and the sun's azimuth 490 is directed to the south.

Azimuth line 490 of the sun may be deduced by processing unit 200, for example, by finding a line pivoted at the zenith 450 which passes through all atmospheric evaluation rings 430 and perpendicular to all e-vectors it passes through. As a result the azimuth line 490 is perpendicular to and halves the e-vector having the highest intensity. Therefore, processing unit 200 may find the e-vector having the highest intensity along azimuth line 290.

Elevation 480 may be deduced by processing unit 200, for example, by measuring the distance between the zenith 450 and the middle point of the c-vector having the highest intensity. As mentioned above, both points are located on azimuth line 490. Alternatively, in case the sun is within field of view of apparatus 10, elevation 480 may be deduced from the detection of direct sun rays. Other embodiments of the present invention may include additional e-vector representations, for example, so that the processing unit 200 may deduce the polarization information using Stokes parameters description and/or any related atmospheric and general scattering theories. In some embodiments, general scattering theories are used in order to compute the accuracy of the apparatus 10 outputs. For example, the apparatus 10 may provide an output of the true north headings at resolution of one milliradian with an error indication of half milliradian as derived from the differences between the scattering theories and the actual computed information from the skylight radiation passed through the polarizer 120.

Figure 5:
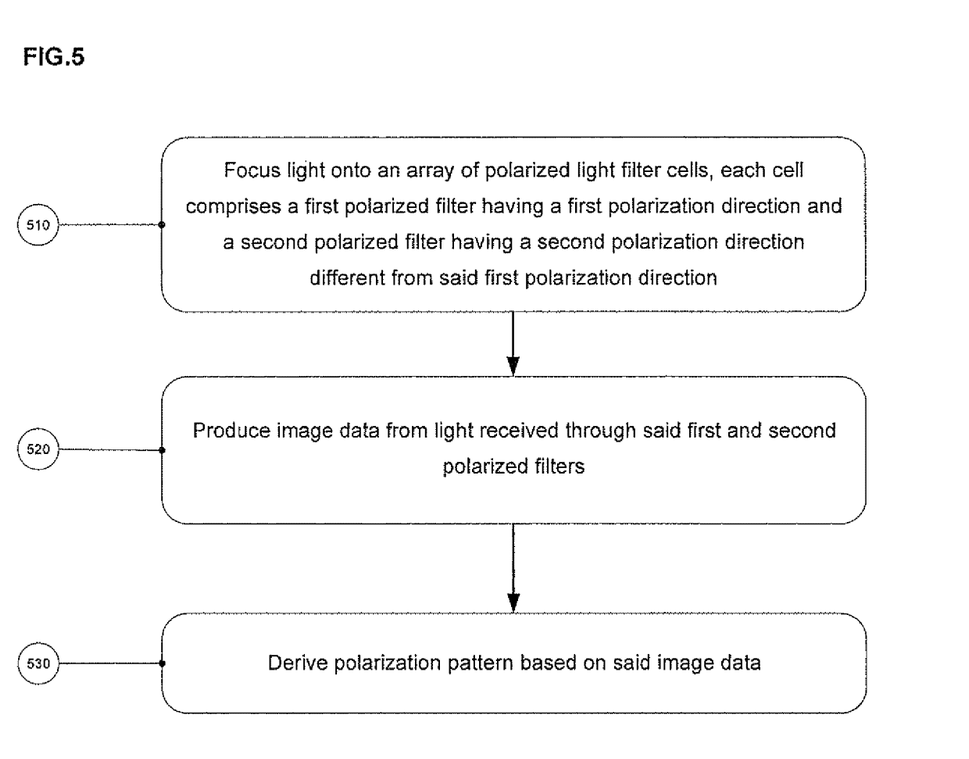
FIG. 5 is a schematic flowchart illustrating a method for navigation according to some embodiments of the present invention.

Reference is now made to FIG. 5, which is a schematic flowchart illustrating a method for navigation according to some embodiments of the present invention. As indicated in block 510, the method may include directing light onto an array of polarized light filter cells 121. As described in detail above, light filter cell 121 may comprises a first polarized filter 125 having a first polarization direction and a second polarized filter 126 having a second polarization direction different from the first polarization direction. For example, the polarization directions of filters 125 and 126 may be substantially perpendicular to each other. As indicated in block 520, the method may include producing data from light received through polarized filters 125 and 126. As indicated in block 530, the method may include deriving polarization pattern based on the produced data. The deriving of the polarization pattern may be performed by calculating at least one of intensity and direction of polarization by measuring the difference between the light intensity received through polarized filters 125 and 126. Based on the derived polarization pattern, for example by using theory of skylight scattering, location data of a celestial body may be calculated, such as, for example, azimuth and/or elevation of the celestial body. Based on the calculated location data of a celestial body navigational data may be calculated, optionally by using also complementary data stored in a memory, as described in detail above.

According to some embodiments, the method may further include separating at least one wavelength band from the directed light, for example, in order to deduce information from the different wavelength bands as described in detail above. Therefore, the pattern of polarized light may be calculated in at least one of the separated wavelength bands.

Additionally, according to some embodiments of the present invention the method may include detecting inclination and/or motion of apparatus 10, thus, for example, enabling compensation for deviated inclination of apparatus 10 when calculating location of a celestial body. In some embodiments, a device may be moved along for example one or more axis, such as for example one of six degree of freedom with a reference to celestial system, and a calculation may be made of the movement of the device relative to the celestial body. For example, a device may be attached to a moving vehicle and the direction, movement or position of the vehicle may be derived by comparing polarization patterns at various times while the vehicle is in motion.

Figure 6A:
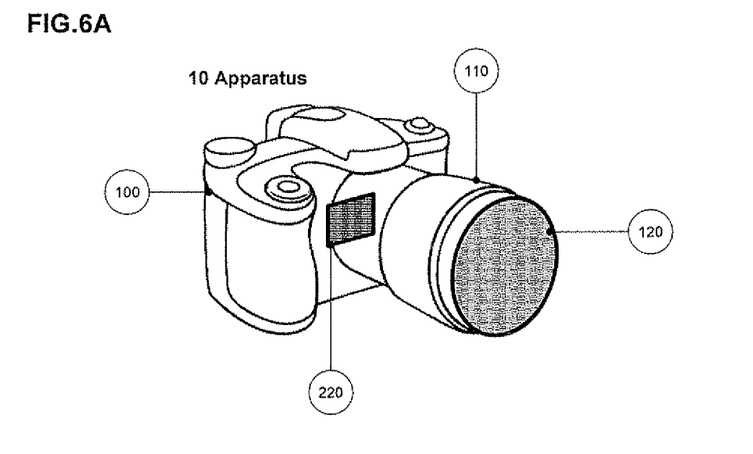
FIGS. 6A and 6B illustrate how the invention can be used in a camera unit, by incorporating full or partial polarizer in the camera unit respectively.
Figure 6B:
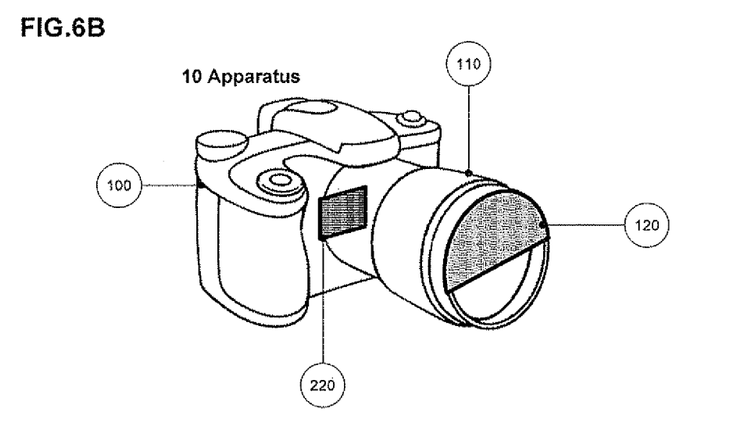
Figure 6C:
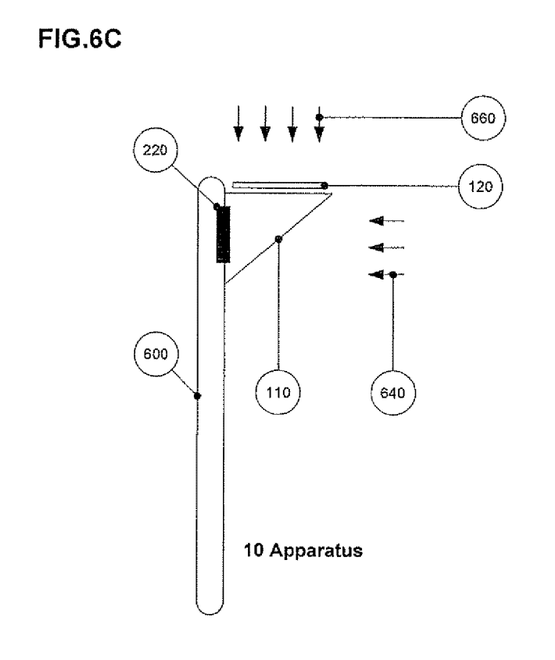
FIG. 6C illustrates the use of the invention in a handheld device utilizing overlying and divided optical path.
Figure 6D:
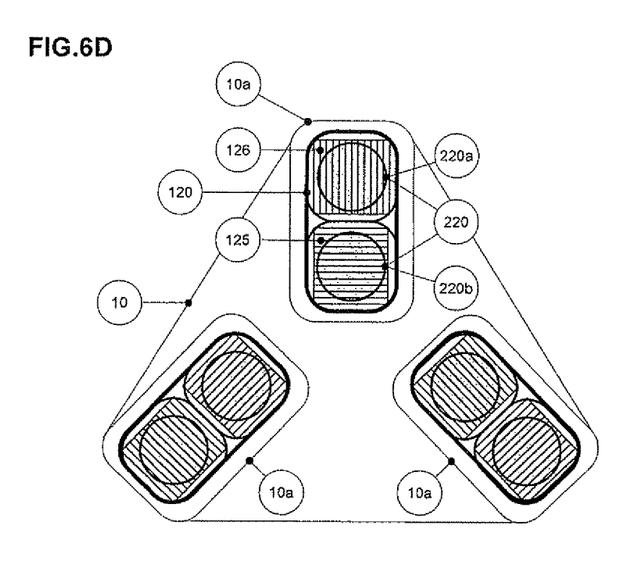
FIG. 6D illustrates an apparatus configured for navigation and utilizing the principles of the invention.

Reference is now made to FIGS. 6A to 6D illustrating three examples of the system, or apparatus, for determining location of a celestial body (e.g. the Sun, Moon or bright stars). FIGS. 6A and 6B illustrate system 10 based on a typical camera unit 100 including a light detector array 220, an optical lens system 110, and including a full or partial polarization filter 120 respectively. The polarization filter 120 may be configured as a radial polarization filter, a tangential polarization filter or a combination of both filter types, as well as may have various other polarization patterns including, but not limited to, rings pattern, matrix, pizza slides, pattern of lines etc. FIG. 6C exemplifies how the principles of the present invention can be used being embedded in a hand-held computing device 600 (e.g. smartphone, tablet computer, laptop or any other computing device having an associated a camera unit, and/or light sensors and/or digital and/or analogue link with the apparatus 10). FIG. 6D illustrates one other configuration of the system 10 according to the present invention which includes a polarization filter 120 configured to include at least two filter cells having different polarization orientations and a sensor unit 220 including at least two light sensitive regions.

The polarization filter 120 of system 10 shown in FIGS. 6A and 6B may be located in the input aperture of the lens system, while being attached to the lens system 110 being or being embedded within the lens system 110; or may be located downstream of the lens system close to the detector array 220. It should be understood, however, that the provision of the optical system is optional. It should be noted that the system 10 can be based on any camera unit including, but not limited to, portable hand held camera unit, web-camera unit, CCTV camera, analogue camera, digital camera, PTZ camera, stabilized payload camera or any other type of camera unit. In some embodiments exemplified in FIG. 6A, the polarizer filter 120 is configured to match the dimensions and geometry of the entire effective aperture defined by the system (e.g. input pupil) being located in a certain plane along an optical path of the collected light or light being collected, thereby affecting all of the collected light components. According to some other embodiments, as shown in FIG. 6B, the polarizer filter 120 may be configured to cover a portion of the effective aperture of the system, thereby affecting only some components of the collected light. In this case, only a certain region of the camera image sensor 220 is used to detect light affected by the polarizer, while other regions of the sensor are used to provide standard image data (configured to fulfill the main camera application).

Preferably, the lens system 110 is capable of macro imaging, i.e. is capable of focusing on object located in close proximity to the camera unit or capable of focusing on object located in far distance and/or with zooming capabilities. The system may utilize a telecentric lens having a narrow field of view and/or a large aperture setting in order to increase the amount of collected light entering the camera system. Utilizing narrow field of view of the lens system 110 can provide an increased azimuthal resolution for determining location of the selected celestial body by apparatus 10. It should be understood that the same is true about the field of view of the system having no focusing arrangement at all, as the case may be. Indeed, the field of view of a light detection system may just be defined by the shape and dimension of an input aperture or generally an optical window. The polarizer may itself constitute such optical window or may be placed between the optical window and the detector (irrespective of whether there is intermediate optics or not).

FIG. 6C illustrates a hand held electronic/computing device 600 (e.g. smartphone, tablet computer etc.) having an integral camera unit including a sensor array 220. The device is configured according to the invention to implement navigational data collection. To this end, the device 600 is equipped with a polarizer unit 120, configured as described above, and arranged to affect light components 660 being collected by the camera unit of the device 600. As indicated above, the polarizer 120 may be configured to affect all of the collected light components 660 or only a part thereof. In case the polarizer unit 120 covers only a part of the effective aperture of the camera unit, some pixels (sensor elements) of the sensor array 220 are dedicated for the navigational purposes of the present invention while other sensor elements can concurrently provide other image data. According to some embodiments, an optical system 110 is located between the polarizer 120 and the sensor array, and such optical system may for example be configured to enable light collection from at least two different fields of view. The optical system 110 may include a prism-like optical system, beam splitter, mirror arrangement or other optical assemblies/elements configured to combine light components coming from different fields of view/different directions. The optical system 110 may be configured to project light components coming from different fields of view on the same or different regions of the sensor unit 220 to thereby provide overlay image or separated images of different fields of view captured by the camera unit. For example, system 10 may be configured to provide imaging of a selected field of view of a scene located at a general direction 640 associated with the horizon (horizon field of view) while collect light components 660 coming from above (the Sky) and passing through the polarizer unit 120 for identifying the location of the Sun (or the Moon or other celestial body) and calculate therefrom various navigational information. To this end, the hand held computing device 600 includes a processor utility (software product) associated with a certain application program interface as well as user interface. It should be understood that utilizing modern smart phone/computer devices, such software product may be downloadable from a server (WebSite) via a communication network (i.e. the Internet) and/or operate via network connection. The processor utility is configured to process image data as described above for calculation of navigational information, time, location, true north, as well as distances between geographical objects, flying objects and/or other celestial bodies (e.g. lunar distance) and/or the distance combination between objects. This navigation-related data may be presented to an operator/user (on the display of the device 600 via the user interface) together with collected image data of the scene, and/or stored or transmitted via a data communication network.

FIG. 6D illustrates one other example of a system 10 according to embodiments of the present invention. System 10 includes three identical units 10a (each configured as the apparatus described above) oriented with a predetermined certain angle of orientation with respect to each other. Each unit 10a includes two light sensor cells 220a and 220b and a polarization filter unit 120. The polarization filter unit 120 includes two filter cells 125 and 126 each configured to allow passage of light of different polarization orientation. The sensor cells 220a and 220b are configured to detect light transmitted through corresponding filter cell such that each of the sensor cells detects light of different polarization orientation. Any of the units 10a or sensor cells 220a or 220b may be associated with an additional optical unit (e.g. prism, beam splitter, polarizing beam splitter, mirror arrangement and/or other optical configuration) configured to provide image overlay and/or divide the received light into the sensor and/or number of sensors.

To this end each of units 10a may be used according to the present invention, however such unit may provide data which includes some uncertainty of the position of the celestial body to be located. For example, a use of a single unit 10a according to this example, by itself, may provide information about the angular (azimuthal) position of the corresponding celestial body being at resolution of one milliradians with respect to a predetermined direction (selected by the orientation of the unit). A combination of two or more such units 10a can provide faster and more accurate data regarding the location of the corresponding celestial body. This information may be used to determine the global location and the north azimuth headings of the apparatus 10. In some embodiments a combination of two or more units 10a provides the apparatus 10 to operate on the analogue domain, where the atmospheric light is converted to analogue signal (Voltage) with no time delay. Analog processing or the generated data can provide an instantaneous output in Voltage.

Determination of azimuthal location of a selected celestial body, e.g. the sun, using system 10 as shown in FIGS. 6A-6B or FIGS. 6C-6D may be performed by orienting the field of view of system 10 to collect atmospheric (ambient) light and processing image data corresponding to polarization intensity pattern of collected atmospheric light. The direction in which light is collected by the apparatus 10 can be derived from the zenith, i.e. at elevation orientation of 90° with respect to the horizon, and/or from the horizon at elevation orientation of 0° with respect to the horizon, and/or at any angle, including negative angle with respect to the horizon.

Accordingly, apparatus 10 may be used to determined location of a celestial body from the ground, looking up at a certain angle, or being airborne or space-borne by directing the apparatus to the ground at a certain angle. It should be understood that "image data" need not contain any identifiable image, and the term "image data" actually corresponds to output data, a bitmap of a light detection unit. It should be noted that the corresponding celestial body need not, and is typically not, within the field of view of the apparatus 10 while collecting input atmospheric (ambient) light. For example, in case of the sun, the system is capable of determining the azimuthal orientation of the sun even during an astronomical twilight where the sun is below the horizon, i.e. before sunrise and/or after sunrise.

Figure 7A:
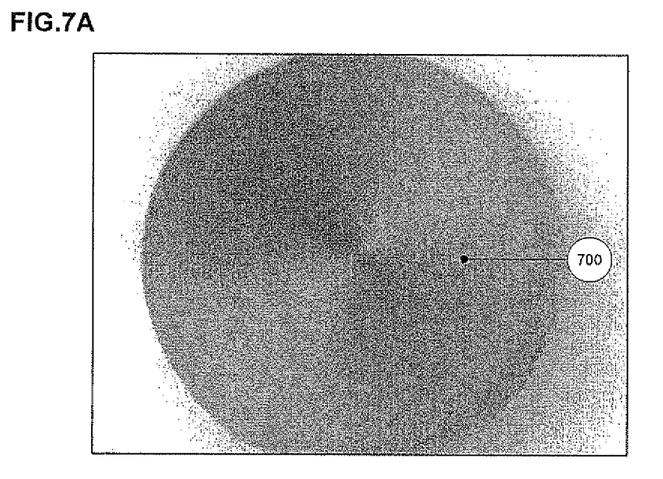
FIGS. 7A-7D exemplify image data collected by a system according to the present invention and a use of such image data for determining location of the Sun, being an example of a celestial body to be located and/or defining the apparatus true north headings.
Figure 7B:
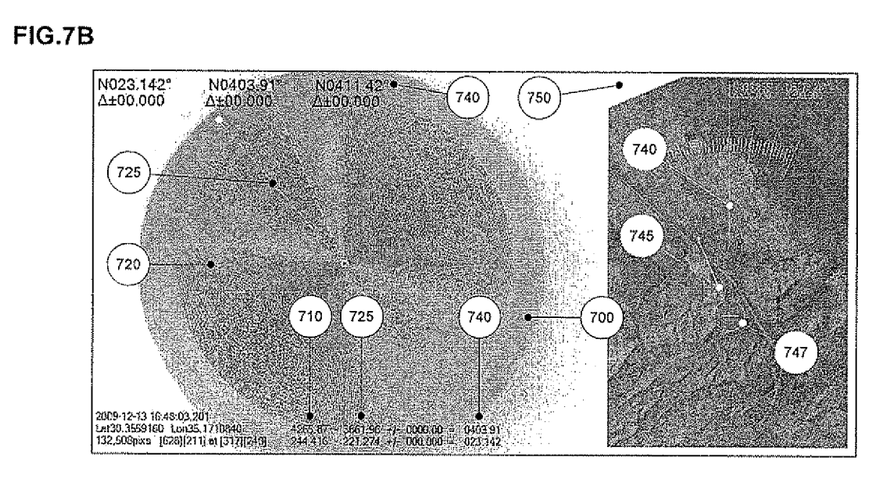

FIGS. 7A to 7D illustrate experimental results of using the experimental set of the system 10 of the invention. The images shown in the figures correspond to image data collected by a system substantially similar to that of FIG. 6A to determine azimuthal location of the Sun and the derivative true north azimuth of the apparatus 10. FIG. 7A shows a raw image data captured by the light sensor 220. The image was taken at 16:48:03 on 2009 Dec. 13; at global location with latitude of 30.355° and longitude of 35.171°. Image 700 illustrates a light intensity pattern, resulting from passing collected light through the polarizer unit as described above. Such light pattern is indicative of a location of the main light source which is typically the Sun or the Moon being the selected celestial body to be located. FIG. 7B shows processed image data including navigational data determined by combining the information from the image 700 and the location and time were the image 700 has been taken. To this end, the location of the Sun can be determined in accordance with the intensity pattern of light as shown in FIG. 7A. Light from the Sun is scattered from various particles in the atmosphere, the polarization of the scattered light is generally perpendicular to a line connecting the particle's location and the Sun. Hence, by locating the "Butterfly" patterns shown in the figure the system determines an axis perpendicular to a line connecting the bright regions in the image, and can thus identify the direction in which the Sun is located with respect to the system. Output information of the system 10 may include a representation of the processed image 720 as shown in FIG. 7B, which illustrates an example of output data generated by a navigational system according to the present invention. The output data may be presented as an image indicating the Sun actual azimuth 725 with respect to the north headings 740 of the system 10. The presented image may also include additional parameters associated with the theoretical azimuth of the Sun 710 based on the time measured by/provided to the system. The true north can be determined by subtracting the two output parameters 720 and 725. A geographical representation 750 may also be presented beside the system 10 outputs, where the system global location 747 is defined at the center of the geographical representation 750, and the angle between the true north 745 and the orientation of the system's headings 740 is well defined; in this example, the angular orientation of the apparatus' heading is 23.142° east.

Figure 7C:
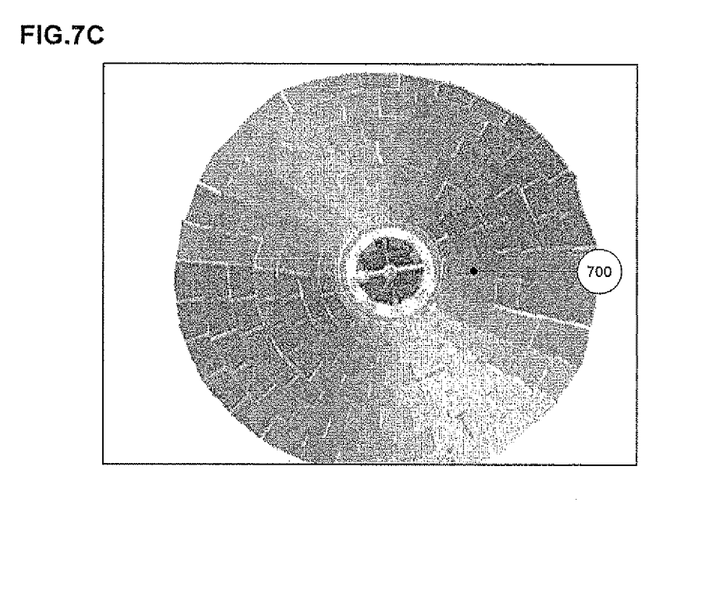
Figure 7D:
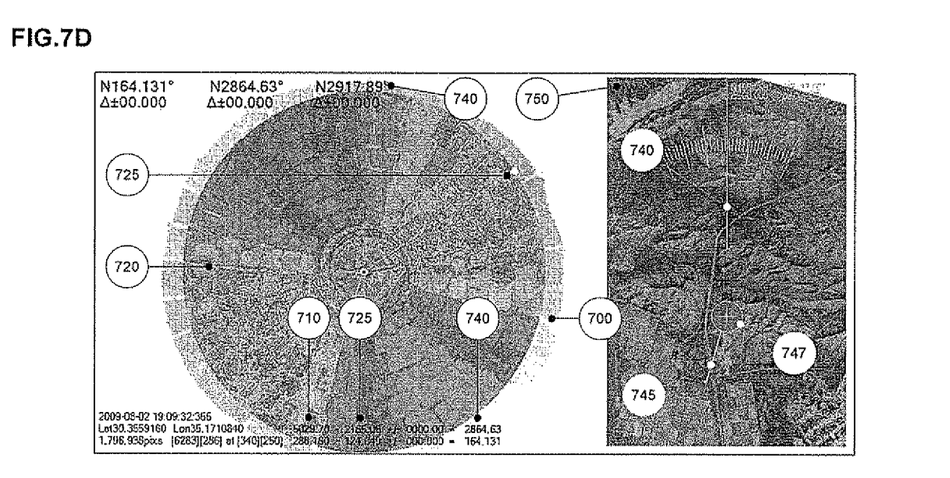

FIGS. 7C and 7D illustrate images similar to those of FIGS. 7a and 7B, but taken utilizing a nano scale size fabricated polarizer unit having a different polarization pattern. FIG. 7C shows a non-processed image data being a raw bitmap 700 captured by the light sensor 220 at 19:09:32 on 2009 Aug. 2; at global location with latitude of 30.355° and longitude of 35.171°. FIG. 7D illustrates processed image including navigational data calculated according to the technique of the present invention as described above.

Thus the present invention provides a novel technique for determining location of a selected celestial body (e.g. the Sun or Moon), which enables accurate calculation of navigation related parameters based on the determined location.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus for use in determining location of a celestial body, the apparatus comprising:
   a polarizer comprising an array of polarized light filter cells comprising at least a first polarization direction and a second polarization direction different from said first polarization direction, said polarizer thereby producing polarized light of at least first and second different polarizations; and
   a light sensor array configured to receive the polarized light from said polarizer and produce data indicative of a pattern of at least one of light polarization intensity and direction, said pattern being indicative of at least one of azimuth and elevation of the celestial body.

2. An apparatus according to claim 1, comprising a processing unit configured and operable to receive and process said data indicative of the pattern of at least one of light polarization intensity and direction, to derive therefrom a polarization pattern, and utilizing the polarization pattern to determine said at least one of azimuth and elevation of the celestial body.

3. An apparatus according to claim 1, wherein the sensor array is configured to provide said data indicative of the pattern of at least one of light polarization intensity and direction in the form of analogue signal corresponding to a difference in intensity of detected light passed through the filter cells of different polarization directions.

4. An apparatus according to claim 1, wherein said second polarization direction is substantially perpendicular to said first polarization direction.

5. An apparatus according to claim 1, wherein said polarizer comprises circular array of said polarized filter cells arranged in the form of co-centric rings.

6. An apparatus according to claim 2, wherein said processing unit is configured and operable for calculating at least one of intensity and direction of collected light polarization by measuring a difference between light intensity received through polarized filter cell having said first polarization direction and light intensity received through polarized filter cell having said second polarization direction and for deriving said polarization pattern based on said calculations.

7. An apparatus according to claim 1, comprising a wavelength selective filter configured to separate at least one wavelength band from the input light.

8. An apparatus according to claim 2, wherein said processing unit is configured and operable for calculating the polarization pattern for at least one wavelength band.

9. An apparatus according to claim 7, wherein said wavelength selective filter comprises one or more groups of filter cells comprising one or more filter cells configured to allow passage of at least two wavelength bands different from each other, each group being associated with corresponding polarized filter.

10. An apparatus according to claim 1, wherein said polarizer comprises at least a region thereof configured as a radial polarizer.

11. An apparatus according to claim 1, wherein said polarizer comprises at least a region thereof configured as a tangential polarizer.

12. An apparatus according to claim 2, comprising a memory unit configured and operable for storing complementary data of at least one of a list comprising a sun path table, an astronomical chart, a calendar chart, an ephemeris table, a time standard, a skylight polarization chart, a calibrated chart of true north, magnetic north and grid north.

13. An apparatus according to claim 1, comprising an inclinometer for detecting the inclination of said apparatus with respect to a predetermined plane.

14. An apparatus according to claim 2, wherein said processing unit is configured and operable for utilizing said at least one of azimuth and elevation of said celestial body for determining at least one of the following parameters: (a) location of said apparatus, (b) time of measurement, (c) headings of said apparatus (d) location of said starts.

15. An apparatus according to claim 2, wherein said processing unit is configured for calculating navigational data based on said at least one of azimuth and elevation of said celestial body.

16. An apparatus according to claim 1, defining a certain effective aperture, wherein the polarizer is aligned with the entire effective aperture.

17. An apparatus according to claim 1, defining a certain effective aperture, wherein the polarizer is aligned with a part of the effective aperture, said sensor array thereby concurrently producing said data indicative of the pattern of at least one of light polarization intensity and direction, and data indicative of an image formed by light passing towards the sensor array through a part of the effective aperture outside said part aligned with the polarizer.

18. An apparatus according to claim 1, defining one or more fields of view and being configured and operable to concurrently direct light collected with said one or more field of view onto said light sensor array.

19. An apparatus according to claim 1, comprising an optical system, said optical system comprising one or more optical elements accommodated upstream or downstream of the polarizer, or at both sides of the polarizer.

* * * * *